US009193100B2

United States Patent
Onodera et al.

(10) Patent No.: US 9,193,100 B2
(45) Date of Patent: Nov. 24, 2015

(54) METHOD FOR MOLDING MOLDED FOAM, AND MOLDED FOAM

(75) Inventors: Masaaki Onodera, Kanagawa (JP); Takehiko Sumi, Kanagawa (JP); Teruo Tamada, Kanagawa (JP); Yu Igarashi, Kanagawa (JP); Yoshinori Ohno, Kanagawa (JP)

(73) Assignee: KYORAKU CO., LTD., Kyoto (JP)

( * ) Notice: Subject to any disclaimer, the term of this patent is extended or adjusted under 35 U.S.C. 154(b) by 464 days.

(21) Appl. No.: 12/913,014

(22) Filed: Oct. 27, 2010

(65) Prior Publication Data

US 2011/0104414 A1 May 5, 2011

(30) Foreign Application Priority Data

Oct. 31, 2009 (JP) .................................. 2009-251557

(51) Int. Cl.
| | |
|---|---|
| *B29C 44/50* | (2006.01) |
| *B29C 49/00* | (2006.01) |
| *C08J 9/06* | (2006.01) |
| *B29K 23/00* | (2006.01) |
| *B29K 105/04* | (2006.01) |

(Continued)

(52) U.S. Cl.
CPC .............. *B29C 44/50* (2013.01); *B29C 49/0005* (2013.01); *C08J 9/06* (2013.01); *B29K 2023/12* (2013.01); *B29K 2105/04* (2013.01); *B29L 2023/004* (2013.01); *B29L 2031/3055* (2013.01); *C08J 2201/03* (2013.01); *C08J 2323/12* (2013.01); *Y10T 428/1352* (2015.01); *Y10T 428/1376* (2015.01)

(58) Field of Classification Search
CPC .. B29C 44/50; B29C 47/004; B29K 2023/12; B29K 2105/04; B32B 1/08; C08J 2201/03; C08J 9/06; Y10T 428/1325; Y10T 428/1376
USPC .............................. 428/36.5; 264/41; 521/142
See application file for complete search history.

(56) References Cited

U.S. PATENT DOCUMENTS

| | | | |
|---|---|---|---|
| 6,432,525 B1 | 8/2002 | Gokuraku et al. | |
| 8,435,615 B2 | 5/2013 | Tsuchida et al. | |

(Continued)

FOREIGN PATENT DOCUMENTS

| | | | |
|---|---|---|---|
| JP | 63-309434 | 12/1988 | |
| JP | 07-266413 | * 10/1995 | .............. B29C 51/10 |

(Continued)

OTHER PUBLICATIONS

Machine Translation of JP 07-266413 (Oct. 1995).*

*Primary Examiner* — Erik Kashnikow
(74) *Attorney, Agent, or Firm* — Hauptman Ham, LLP

(57) ABSTRACT

The invention provides a molded foam molding method capable of obtaining a molded foam in which pinholes may not be formed with ease even when a blow ratio is high and which has a high expansion ratio. The invention also provides a molded foam which includes no pinholes, is reduced in weight, and is excellent in heat insulating property. The molding method includes blending a polypropylene-based resin having an equilibrium compliance from 2.0 to 6.0 ($10^{-3} \times Pa^{-1}$) with a foaming agent and kneading the blend in an extruder. The extruded foamed resin is molded so as to be fit along a mold by a pressurized fluid. Moreover, the molded foam is formed by the method described above, and has an expansion ratio from 1.5 to 5.0 times and an impact strength of not less than 30 kg·cm.

8 Claims, 5 Drawing Sheets

(51) Int. Cl.
*B29L 23/00* (2006.01)
*B29L 31/30* (2006.01)

(56) References Cited

U.S. PATENT DOCUMENTS

| | | |
|---|---|---|
| 8,535,598 B2 | 9/2013 | Imanari et al. |
| 2007/0031622 A1 | 2/2007 | Imanari et al. |
| 2007/0078191 A1* | 4/2007 | Guhde et al. .................. 521/99 |
| 2012/0135173 A1 | 5/2012 | Tsuchida et al. |

FOREIGN PATENT DOCUMENTS

| | | |
|---|---|---|
| JP | 2005-241157 | 9/2005 |
| JP | 3745960 B2 | 2/2006 |
| JP | 2007-62364 A | 3/2007 |
| JP | 2010-247427 A | 11/2010 |

* cited by examiner

METHOD FOR MOLDING MOLDED FOAM, AND MOLDED FOAM

CROSS-REFERENCE TO RELATED APPLICATION

This application is based on Japanese Patent Application No. 2009-251557 filed with the Japan Patent Office on Oct. 31, 2009, the entire content of which is hereby incorporated by reference.

BACKGROUND

1. Technical Field

The present invention relates to a method for molding a molded foam for use in, e.g., a climate control duct for vehicles, and such a molded foam.

2. Related Art

A conventional molded foam molding method involves melting and kneading a foaming agent and a base resin by an extruder, extruding the blend through a die to mold the blend into a foamed parison in a cylinder shape, clamping split mold blocks with the parison inserted therebetween, and subjecting the parison to blow molding by blowing a pressurized gas into the parison (refer to Patent Document 1). Herein, a polypropylene-based resin is used as the base resin in consideration of heat resistance, rigidity and the like regarding the molded body.

Such a conventional technique has the following problem. That is, when the foamed parison of the polypropylene-based resin is extruded, foamed cells that are open to the atmosphere rapidly expand. Consequently, surfaces of the cells become broken and an expansion ratio adversely decreases.

In this regard, according to a molding method disclosed in Patent Document 2, it is possible to obtain a molded foam with a high expansion ratio by using a polypropylene-based foaming resin with an improved melt tension. The molding method in Patent Document 2 introduces a long chain branching structure in order to improve the melt tension of the polypropylene-based resin.

In the foaming and blow molding in Patent Document 2, however, the polypropylene having a long chain branching structure causes the following problem. That is, if the expansion ratio increases, a pinhole may be formed with ease in a portion where a foamed resin expands largely (e.g., a portion where a blow ratio is high) at the time of molding.

In addition, the molded foam using the polypropylene having a long chain branching structure has a problem of considerably deteriorated impact resistance.

Because of the circumstances described above, it has conventionally been difficult to mold a molded body which is made of a foamed resin expanding largely at the time of molding and which has a high expansion ratio. Therefore, it has been difficult to obtain a molded foam which has a portion where a foamed resin expands largely in molding, includes no pinhole, is reduced in weight, and is excellent in heat insulating property and impact resistance.

The documents that describe the related art are listed below.

Patent Document 1: JP 63-309434 A
Patent Document 2: Japanese Patent No. 3745960

SUMMARY

In view of the problems described above, an object of the present invention is to provide a molded foam molding method capable of obtaining a molded foam in which a pinhole may not be formed with ease even when a foamed resin expands largely in molding and which has a high expansion ratio. Further, another object of the present invention is to provide a molded foam in which a portion where a foamed resin expands largely in molding is molded without pinhole, which is reduced in weight, and which is excellent in heat insulating property and impact resistance.

(1) The present invention provides a method for molding a molded foam, including the steps of: blending a polypropylene-based resin having an equilibrium compliance from 2.0 to 6.0 ($10^{-3} \times Pa^{-1}$) with a foaming agent and kneading the blend in an extruder; and molding the foamed resin extruded through the extruder so as to be fit along a mold by a pressurized fluid.

According to this configuration, it is possible to obtain a molded foam in which a pinhole may not be formed with ease even when a foamed resin expands largely in molding and which has a high expansion ratio.

(2) The present invention also provides a molded foam obtained by blending a polypropylene-based resin having an equilibrium compliance from 2.0 to 6.0 ($10^{-3} \times Pa^{-1}$) with a foaming agent and kneading the blend in an extruder, and molding the foamed resin extruded through the extruder so as to be fit along a mold by a pressurized fluid. The molded foam has a maximum blow ratio from 0.4 to 0.6, an expansion ratio from 1.5 to 5.0 times, and an impact strength of not less than 30 kg·cm.

This molded foam is molded without pinhole even in a portion where the foamed resin expands largely. Further, the molded foam is reduced in weight and is excellent in heat insulating property. In addition, cracking due to vibration generated while a vehicle travels may not occur with ease in the molded foam.

(3) Preferably, the molded foam may be used as a climate control duct for a vehicle. According to this configuration, it is possible to reduce a weight of the duct, and therefore to provide a vehicle with improved fuel efficiency. In addition, it is possible to efficiently control the climate inside the vehicle since the duct is improved in heat insulating property. Moreover, cracking may not occur with ease while the vehicle travels.

According to the present invention, it is possible to provide a molded foam molding method capable of obtaining a molded foam in which a pinhole may not be formed with ease even when a foamed resin expands largely in molding and which has a high expansion ratio.

According to the present invention, moreover, it is possible to provide a molded foam which includes no pinhole even in a portion where a foamed resin expands largely, is reduced in weight, is excellent in heat insulating property, and may not be subjected to cracking with ease.

BRIEF DESCRIPTION OF THE DRAWINGS

The foregoing and other objects, features, aspects and advantages of the invention will become more apparent from the following detailed description when taken in conjunction with the accompanying drawings, in which.

DESCRIPTION OF EMBODIMENTS

The following describes, in detail, a molded foam according to an embodiment of the present invention and a method for molding the same, in a case where the molded foam is a vehicle duct.

However, the present invention is not limited to the vehicle duct, and can be applied to other types of molded foam, e.g., other automotive components and containers.

Figure 1:
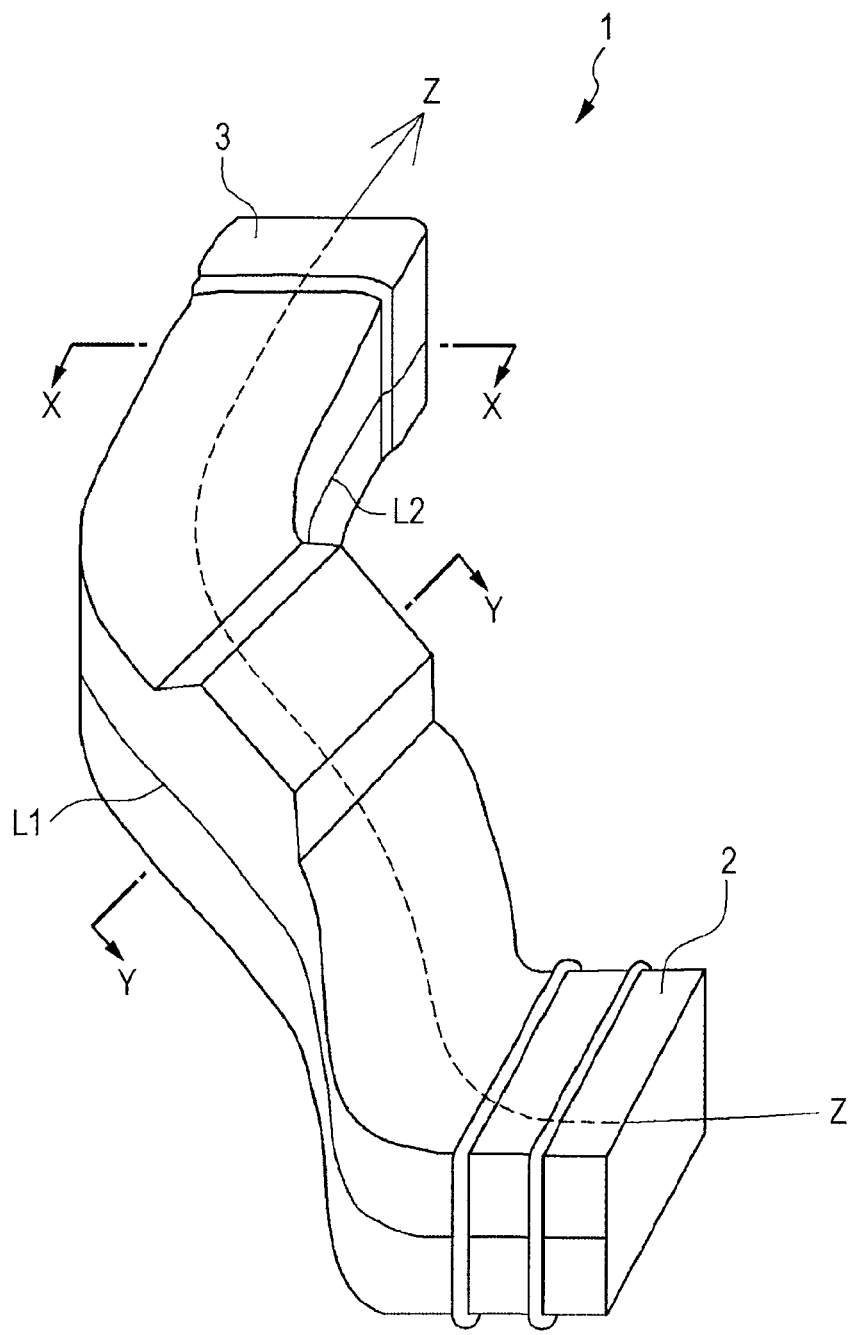
FIG. 1 is a perspective view illustrating a vehicle duct as a molded foam according to an embodiment of the present invention.

FIG. 1 is a perspective view illustrating a vehicle duct 1 as the molded foam according to the embodiment of the present invention.

Specifically, FIG. 1 illustrates an air inlet 2, an air outlet 3, and parting lines (PL) L1 and L2 that are left in a molded body according to split surfaces of a mold.

Figure 2:
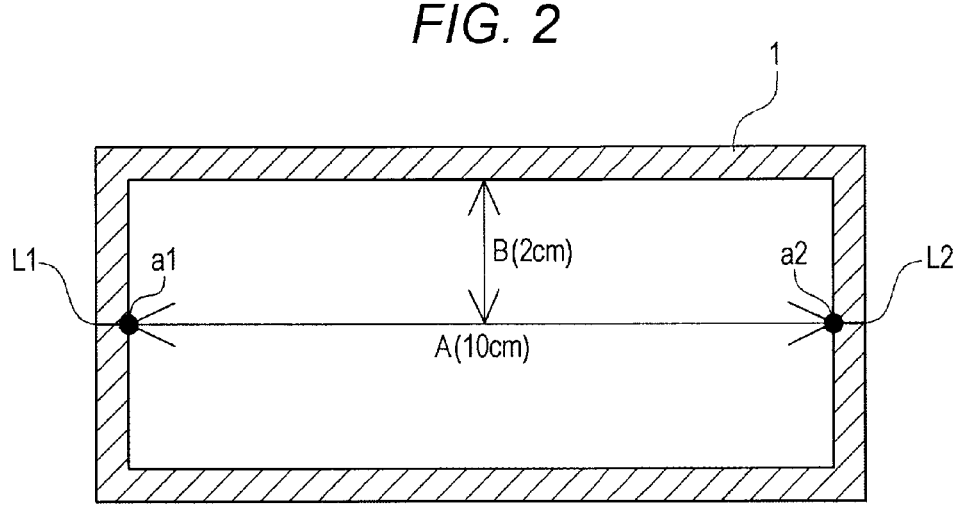
FIG. 2 is a sectional view taken along a line X-X in the vehicle duct illustrated in FIG. 1.
Figure 3:
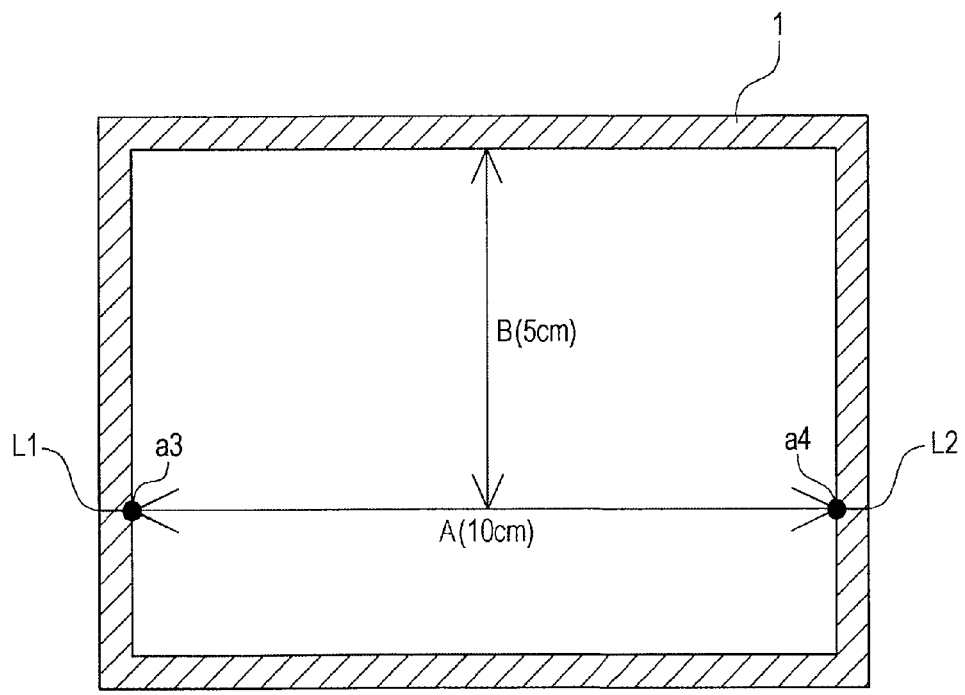
FIG. 3 is a sectional view taken along a line Y-Y in the vehicle duct illustrated in FIG. 1.

FIG. 2 is a sectional view taken along a line X-X in the vehicle duct 1 illustrated in FIG. 1, and FIG. 3 is a sectional view taken along a line Y-Y.

Herein, sections illustrated in FIG. 2 and FIG. 3 are perpendicular to an extending direction of the hollow duct (a direction indicated by an arrow Z in FIG. 1). FIG. 2 illustrates a portion having a blow ratio of 0.2, and FIG. 3 illustrates a portion having a blow ratio of 0.5.

Figure 5:
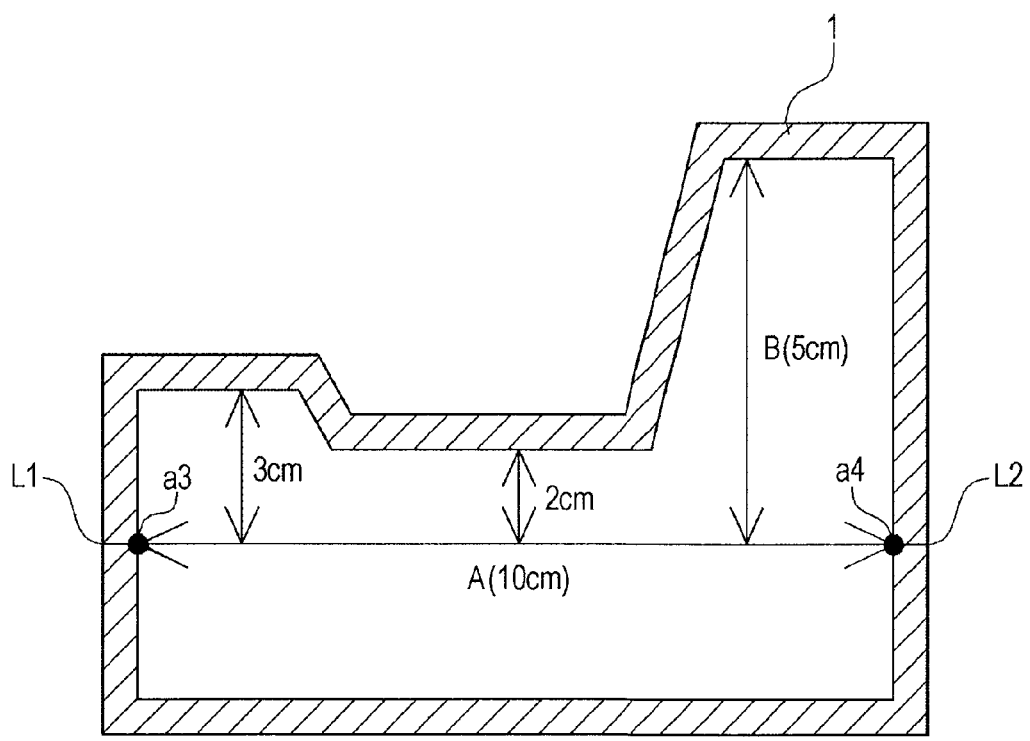
FIG. 5 is a sectional view for explanation of a blow ratio.

In this description, the blow ratio represents a ratio (B/A) of a distance B to a length A in the section perpendicular to the hollow shape extending direction, where the length A is a length of a straight line connecting the parting line L1 and the parting line L2, and the distance B is a distance between the straight line and an inner wall surface that is the most distant from the straight line. As illustrated in FIG. 5, for example, the blow ratio is 0.5 in a case where the section has irregularities formed thereon.

Figure 6:
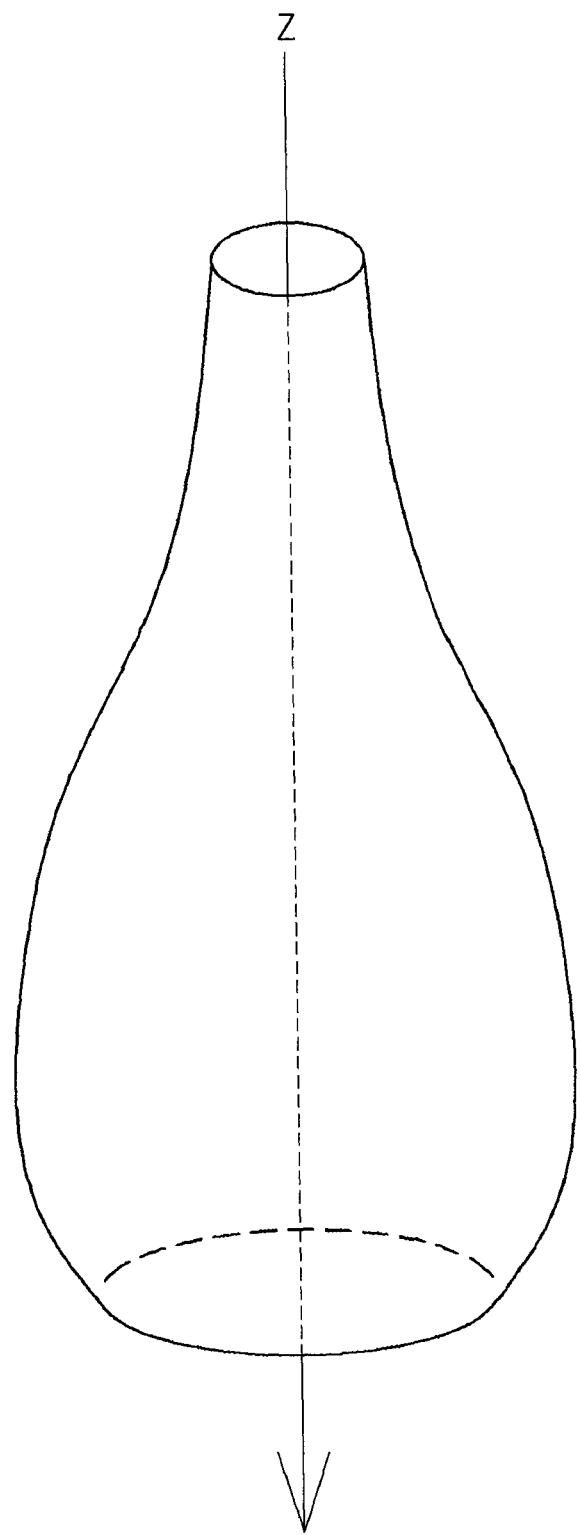
FIG. 6 is a perspective view for explanation of a hollow shape extending direction.

In this description, moreover, the hollow shape extending direction indicates a direction along which a hollow portion of the molded body extends. In a duct having open two ends, this direction represents a line parallel to a ventilation path in the duct. As illustrated in FIG. 6, in a molded body having an open end only on one side (such as a container), the hollow shape extending direction is directed from its opening toward its bottom (a direction indicated by an arrow Z in FIG. 6).

In this description, further, a maximum blow ratio represents the largest value of the blow ratio that varies according to a position along the hollow shape extending direction.

The vehicle duct 1 illustrated in FIG. 1 is made of a polypropylene-based resin having an equilibrium compliance from 2.0 to 6.0 ($10^{-3} \times Pa^{-1}$), a maximum blow ratio of 0.5, an expansion ratio from 1.5 to 5.0 times, and an impact strength of not less than 30 kg·cm.

Herein, the equilibrium compliance was measured in accordance with the following procedure.

A polypropylene-based resin blend was extruded from a flat die of 25 mm×1 mm through a 25-mm extruder at 200° C. to prepare a sheet. The resultant sheet was formed in a disk shape having a thickness of 2 mm and a diameter of 25 mm under pressing conditions of 260° C. and 8000 kPa×5 minutes to prepare a test sample. Subsequently, this test sample was subjected to creep compliance measurement, so that a curving line indicating creep compliance-time was found. Then, an approximate equation (a linear equation) was formulated using a time range (200 to 300 seconds) within which the creep compliance linearly changes to the time in the curving line. Calculation was performed taking an intercept of the formulated approximate equation as the equilibrium compliance. A testing machine used herein and measurement conditions are as follows.

Used testing machine: Bohlin rotational rheometer (Gemini HR nano) provided by MALVERN Instruments Ltd.

Measurement mode. Torsional deformation mode using parallel plates

Measurement Temperature: 210° C.

Gap distance: 1.4 mm

Creep stress: 100 Pa

Examples of specific measures that can be taken in order to increase the equilibrium compliance of the polypropylene-based resin include the following.

To use polypropylene which is suitable for foam molding and has a long chain branching structure in which an MFR (Melt Flow Rate) at 230° C. is not more than 2.5 g/10 minutes (e.g., Daploy WB130 provided by Borealis AG).

To use a polypropylene-based resin containing ultrahigh molecular weight polyethylene (e.g., NEWFOAMER FB3312 provided by Japan Polypropylene Corporation).

To blend low-density polyethylene with a polypropylene-based resin.

Herein, the value of the MFR is taken as a result of measurement according to JIS K-7210 under conditions that a test temperature is 230° C. and a test load is 2.16 kg.

The expansion ratio was calculated in the following manner. First, 2-cm-square test pieces were respectively cropped from three portions near a center and two ends (i.e., an upper end and a lower end) of the molded foam. Then, specific gravities of the three test pieces were measured according to JIS K-7112 using an electronic densimeter EW-200SG provided by Alfa Mirage Co., Ltd. By taking an arithmetic average to the three values of the specific gravities, an average specific gravity of the molded foam was calculated. Subsequently, the expansion ratio was calculated by dividing a specific gravity of the polypropylene-based resin before foaming by the average specific gravity.

When the expansion ratio is less than 1.5 times, there are drawbacks that the weight can not be reduced sufficiently and condensed moisture is generated with ease on a surface. In particular, when the expansion ratio is less than 1.5 times, the vehicle duct has a drawback that a heat loss property is poor. On the other hand, when the expansion ratio exceeds 5.0 times, the vehicle duct has a drawback that the strength decreases and deformation due to an external force occurs with ease.

An average thickness of the molded foam is preferably 0.7 to 5.0 mm.

The average thickness was calculated in the following manner. First, the thicknesses were measured using a vernier caliper at positions (six in total) that cross a perpendicular bisector of a line connecting two dividing points of the mold in sections respectively at three portions near the center and the two ends (i.e., the upper end and the lower end) of the molded foam. Then, an average value of the six measured values was calculated as an average thickness.

When the average thickness is less than 0.7 mm, there are drawbacks that the strength decreases and deformation due to an external force occurs with ease. On the other hand, when the average thickness exceeds 5.0 mm, there are drawbacks that the weight can not be reduced sufficiently and an internal volume of the molded foam decreases. In particular, when the average thickness exceeds 5.0 mm, the vehicle duct has a drawback that a pressure loss increases when blowing air.

The blow ratio was calculated in the manner as described above. It is preferable that the blow ratio be not less than 0.4 in order to sufficiently ensure the internal volume of the molded foam. However, when the blow ratio exceeds 0.6, the strength decreases since the thickness becomes thinner. Accordingly, there are possibilities that deformation due to an external force may occur and a pinhole may be formed. Therefore, it is preferable that the maximum blow ratio be within a range between not less than 0.4 and not more than 0.6.

It should be noted that it is possible to prevent pinholes from being formed more definitely by molding the molded foam to have the maximum blow ratio of smaller than 0.5.

The impact strength was calculated in the following manner. First, the molded foam was left in a constant-temperature oven at −10° C. for not less than one hour. Subsequently, a metallic ball of 1 kg was dropped so as to collide with a flat portion of the molded foam. Then, a minimum height (cm) of the metallic ball at which cracking occurs because of the dropping and colliding was measured at an interval of 10 cm. Thereafter, the impact strength was calculated by a product of the weight 1 kg of the metallic ball and the minimum height (cm).

When the impact strength is less than 30 kg·cm, there is a possibility that cracking may occur especially in the case of the vehicle duct, when the vehicle vibrates or when vehicle components are assembled or transported.

An example of specific measures for increasing the impact strength of the molded foam is to blend low-density ethylene-α-olefin, styrene elastomer, ethylene-propylene block copolymer or the like with a polypropylene-based resin.

Figure 4:
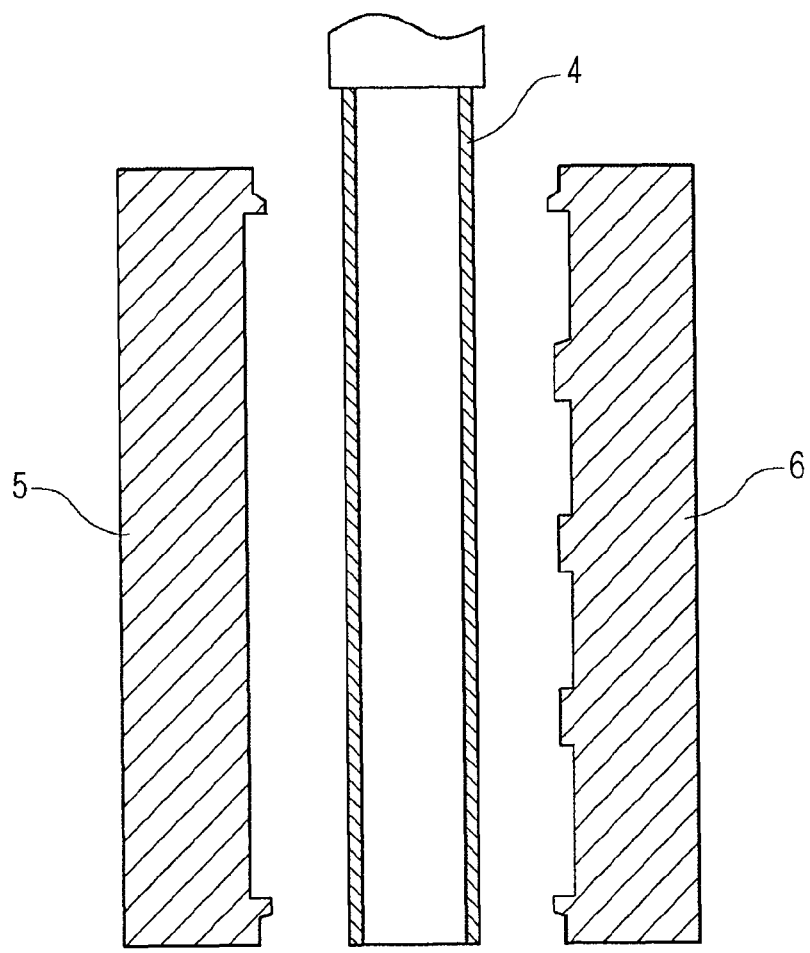
FIG. 4 is a sectional view illustrating blow molding.

The vehicle duct 1 is subjected to blow molding as illustrated in FIG. 4. As illustrated in FIG. 4, in an extruder (not illustrated), a foaming agent is added to a polypropylene-based resin having an equilibrium compliance from 2.0 to 6.0 ($10^{-3} \times Pa^{-1}$) and the blend is kneaded. Then, the resin is retained in an accumulator (not illustrated). Subsequently, after a predetermined amount of resin is retained, a foamed cylindrical parison 4 is extruded from a die slit by pressing a piston of the accumulator. Then, the parison 4 is inserted between split mold blocks 5 and 6 which are clamped, and air for molding (pressurized fluid) is blown into the parison 4. Thus, an outer surface of the parison 4 fits along an internal surface of the mold, and the duct-shaped molded foam illustrated in FIG. 1 (blow molded foam) is formed.

It should be noted that the blend of the polypropylene-based resin and the foaming agent is not necessarily retained in the accumulator after being kneaded in the extruder. In this case, the foamed cylindrical parison is continuously extruded directly from the die slit, and then the molded foam can be formed in the same manner.

Further, it is not necessary to extrude the foamed resin into a cylinder shape. The molding can be implemented by extruding the foamed resin in a sheet shape, and the sheet-shaped foamed resin is brought into close contact with the mold by pressing into the mold by the pressure of the air (pressurized fluid).

Moreover, it is not necessary to mold the molded foam by the blow molding as described above. It is possible to employ vacuum forming that involves attaching the extruded foamed resin to the mold by suction to mold the foamed resin into the predetermined shape.

The foaming agent may be an inorganic physical foaming agent such as air, carbonic acid gas, nitrogen gas or water, an organic physical foaming agent such as butane, pentane, hexane, dichloromethane or dichloroethane, or a chemical foaming agent such as sodium bicarbonate, citric acid, sodium citrate or azodicarbonamide. Herein, the physical foaming agent and the chemical foaming agent may be used together.

EXAMPLES

In experimental examples and comparative examples to be described below, a molded foam was molded using a mold for a vehicle duct having a portion where a blow ratio is 0.7. Here, foam and blow molding was performed while changing a maximum blow ratio of the mold from 0.2 to 0.7 by applying putty at a portion where the blow ratio is high. Then, it was determined whether or not the molding is possible with the value of the maximum blow ratio. Further, an equilibrium compliance of a polypropylene-based resin, as well as an expansion ratio and an impact strength of the resultant molded foam were measured in the manner as described above. The measurement results and evaluation results are shown in Table 1 along with compounding ratios of the polypropylene-based components. As used herein, the term "unmolded" in Table 1 refers to a state in which the shape of the mold is not transferred.

Example 1

As a polypropylene-based resin, a blend (equilibrium compliance: $2.0 \times 10^{-3} \times Pa^{-1}$) of 30 wt % of propylene homopolymer having a long chain branching structure in which an MFR at 230° C. is 2.1 g/10 minutes (Daploy WB130 provided by Borealis AG) and 70 wt % of crystalline ethylene-propylene block copolymer in which an MFR at 230° C. is 0.5 g/10 minutes (NOVATEC EC9 provided by Japan Polypropylene Corporation) was used. To this blend, a foaming agent and 0.8 parts by weight (in terms of talc) of a talc masterbatch (MAT360H provided by Shiraishi Calcium Kaisha, Ltd.) as a foaming core agent were added. Then, the blend was kneaded in an extruder and retained in an accumulator. Subsequently, after a predetermined amount of resin is retained, a foamed cylindrical parison was extruded from a die slit by pressing a piston of the accumulator. The parison was then inserted into a vehicle duct mold having a portion where a blow ratio is 0.7, so that a molded foam having an average thickness from 1.5 to 2.0 mm was obtained by blowing air for molding of 0.1 MPa into the parison. The maximum blow ratio was changed from 0.2 to 0.7 by applying putty to the portion where the blow ratio is 0.7, and the maximum blow ratio at which the molding can be performed without causing a pinhole or without resulting in an unmolded state was confirmed. The maximum blow ratio determined as a result was 0.6. Therefore, an internal volume of the molded foam was ensured sufficiently. Further, an impact strength of the obtained molded foam was 30 kg·cm. Therefore, in this molded foam as the vehicle duct, there was no possibility of causing cracking when a vehicle vibrates or when vehicle components are assembled or transported. Further, an expansion ratio of the obtained molded foam was 1.5 times. Therefore, a heat insulating property was sufficient as well.

Examples 2 to 7

Similarly to Example 1, a molded foam was obtained using a blend having a compounding ratio shown in Table 1. In particular, in cases of Examples 2, 4, 5 and 6, a regrind of a molded foam was reused and blended into a raw material so as to be 70 wt % in the entire blend. According to any of Examples 2 to 7, no pinhole is formed even when a maximum blow ratio is 0.4. Further, since an impact strength is not less than 30 kg·cm, there was no possibility of causing cracking when a vehicle vibrates or when vehicle components are assembled or transported. Moreover, since an expansion ratio was not less than 1.5 times, a heat insulating property was sufficient.

Comparative Example 1

Similarly to Example 1, a molded foam was obtained using crystalline ethylene-propylene block copolymer (NOVATEC EC9 by Japan Polypropylene Corporation) (equilibrium compliance: $0.4 \times 10^{-3} \times Pa^{-1}$) having an MFR at 230° C. of 0.5 g/10 minutes as a polypropylene-based resin. An impact strength in this example was 30 kg·cm, which was sufficient. However, an expansion ratio was 1.3 times, and a heat insulating property was insufficient. Further, a pinhole was formed in a portion where a blow ratio is 0.2, and therefore it was not possible to obtain a molded foam for which an internal volume was sufficiently ensured.

Comparative Example 2

Similarly to Example 1, a molded foam was obtained using propylene homopolymer having a long chain branching structure (Profax PF814 provided by SunAllomer Ltd.) (equilibrium compliance: $2.5 \times 10^{-3} \times Pa^{-1}$) having an MFR at 230° C. of 3.0 g/10 minutes as a polypropylene-based resin. An expansion ratio was 1.5 times, and a heat insulating property was sufficient. Further, no pinhole was formed even when a maximum blow ratio is 0.4. However, an impact strength was 10 kg·cm. Therefore, there was a possibility of causing cracking when the vehicle vibrates or when vehicle components are assembled or transported.

Comparative Examples 3 to 7

Similarly to Example 1, a molded foam was obtained using a blend having a compounding ratio shown in Table 1. In particular, in cases of Comparative Examples 4 to 7, a regrind of a molded foam was reused and blended into a raw material so as to be 70 wt % in the entire blend. According to any of Comparative Examples 3 to 7, a problem occurs in molding when a maximum blow ratio is 0.4. Specifically, a pinhole was formed in Comparative Examples 4 and 7, and Comparative Examples 3, 5 and 6 remain unmolded. Further, in Comparative Example 4, an impact strength is less than 30 kg·cm, and there is a possibility of causing cracking when the vehicle vibrates or when vehicle components are assembled or transported.

The following facts are apparent from the evaluation results as shown above.

Using the polypropylene-based resin having the equilibrium compliance from 2.0 to 6.0 ($10^{-3} \times Pa^{-1}$), it is possible to obtain a molded foam having an expansion ratio from 1.5 to 5.0 times and a maximum blow ratio of not less than 0.4 and including no pinhole.

Further, it is possible to obtain a molded foam having an impact strength of not less than 30 kg·cm when using the polypropylene having a long chain branching structure (e.g., WB130 provided by Borealis AG) blended with one of or a compound of ethylene-propylene block copolymer (e.g., EC9, FB3312 provided by Japan Polypropylene Corporation), low-density ethylene-α-olefin (e.g., CX2001 provided by Sumitomo Chemical Co., Ltd.), styrene elastomer (e.g., H1062 provided by Asahi Kasei Chemicals), and low-density polyethylene (such as F108-1 provided by Sumitomo Chemical) is used as the polypropylene-based resin having the equilibrium compliance from 2.0 to 6.0 ($10^{-3} \times Pa^{-1}$).

TABLE 1

| | | Virgin Material | Talc | Grind Ratio | Equilibrium Compliance | Maximum Blow Ratio | | | | | | |
|---|---|---|---|---|---|---|---|---|---|---|---|---|
| | | Compounding Ratio | Parts | % | $10^{-3} \times P^{-1}$ | 0.2 | 0.3 | 0.4 | 0.5 | 0.6 | 0.7 | Judgment |
| Examples | 1 | WB130/EC9 = 30/70 | 0.8 | 0 | 2.0 | A | A | A | A | A | B | OK |
| | 2 | WB130/FB3312/CX2001 = 70/15/15 | 0.8 | 70 | 2.9 | A | A | A | A | B | C | OK |
| | 3 | WB130/FB3312/CX2001 = 30/60/10 | 0.8 | 0 | 5.2 | A | A | A | B | C | C | OK |
| | 4 | WB130/FB3312/CX2001 = 30/60/10 | 0.8 | 70 | 4.5 | A | A | A | B | C | C | OK |
| | 5 | WB130/FB3312/H1062 = 30/55/15 | 0.8 | 70 | 5.4 | A | A | A | A | B | C | OK |
| | 6 | WB130/F108-1 = 65/35 | 0.8 | 70 | 2.5 | A | A | A | B | C | C | OK |
| | 7 | FB3312 | 0.8 | 0 | 6.0 | A | A | A | B | C | C | OK |
| Comparative Examples | 1 | EC9 | 0.8 | 0 | 0.4 | B | C | C | C | C | C | NG |
| | 2 | PF814 | 0.8 | 0 | 2.5 | A | A | A | B | C | C | OK |
| | 3 | EG7FT | 0.8 | 0 | 0.3 | B | C | C | C | C | C | NG |
| | 4 | PF814 | 0.8 | 70 | 1.7 | A | A | B | C | C | C | NG |
| | 5 | PF814/EC9 = 30/70 | 0.8 | 70 | 0.9 | A | B | C | C | C | C | NG |
| | 6 | PF814/EC9 = 50/50 | 0.8 | 70 | 1.3 | A | B | C | C | C | C | NG |
| | 7 | PF814/EC9/CX2001 = 70/15/15 | 0.8 | 70 | 1.6 | A | A | B | C | C | C | NG |

| | | Foaming Ratio | | Impact Strength | | General |
|---|---|---|---|---|---|---|
| | | Times | Judgment | kg · cm | Judgment | Judgment |
| Examples | 1 | 1.5 | OK | 30 | OK | OK |
| | 2 | 2.0 | OK | 50 | OK | OK |
| | 3 | 5.0 | OK | 40 | OK | OK |
| | 4 | 3.2 | OK | 30 | OK | OK |
| | 5 | 1.8 | OK | 150 | OK | OK |
| | 6 | 2.6 | OK | 40 | OK | OK |
| | 7 | 1.8 | OK | 60 | OK | OK |
| Comparative Examples | 1 | 1.3 | NG | 30 | OK | NG |
| | 2 | 1.5 | OK | 10 | NG | NG |
| | 3 | 1.5 | OK | 30 | OK | NG |
| | 4 | 4.5 | OK | 10 | NG | NG |
| | 5 | 1.5 | OK | 30 | OK | NG |
| | 6 | 1.8 | OK | 30 | OK | NG |
| | 7 | 2.5 | OK | 40 | OK | NG |

A: Molded,
B: Molded with pinhole,
C: Unmolded
WB130: HMS-PP, Borealis,
EC9: Block PP, Japan Polypropylene,
FB3312: HMS-PP, Japan Polypropylene,
CX2001: LLDPE, Sumitomo Chemical,
H1062: SEBS, Asahi Kasei Chemicals,
F108-1: LDPE, Sumitomo Chemical,
PF814: HMS-PP, SunAllomer,
EG7FT: Random PP, Japan Polypropylene,
Talc: MAT360H, Shiraishi Calcium (60%, PP-based, foaming core agent)

Moreover, it is also possible to obtain a molded foam having an impact strength of not less than 30 kg·cm and an expansion ratio from 1.5 to 5.0 times and including a portion where a blow ratio is 0.4 to 0.6 when the polypropylene-based resin having the equilibrium compliance from 2.0 to 6.0 ($10^{-3} \times Pa^{-1}$) is only polypropylene containing ultrahigh molecular weight polyethylene (e.g., FB3312 provided by Japan Polypropylene Corporation).

The molded foam of the present invention has been described as, but not limited to, the vehicle duct, and the present invention can be applied to other automotive components (such as cargo floor boards, deck boards, rear parcel shelves, roof panels, interior panels such as door trims, door inner panels, platforms, hardtops, sun roofs, bonnets (hoods), bumpers, floor spacers, tibia pads, shock absorbing pads, and engine under covers), containers, and such.

Regarding the industrial applicability, the molded foam molding method according to the present invention can be utilized in the molding of ducts, containers, automotive components and the like. Further, the molded foam according to the present invention can be used as ducts, containers, automotive components and the like.

When the invention has been illustrated and described in detail, the forgoing description is in all aspects illustrative and not restrictive. It is therefore understood that numerous modifications and variations can be devised without departing from the spirit and scope of the invention.

What is claimed is:

1. A method for molding a molded foam, comprising the steps of:
   blending a polypropylene-based resin having an equilibrium compliance from 2.0 to 6.0 ($10^{-3} \times Pa^{-1}$), which is a blend mixed with 70 wt % or more of a regrind of the molded foam, with a foaming agent and kneading the blend in an extruder; and
   molding the foamed resin extruded through the extruder so as to be fit along a mold by a pressurized fluid, wherein molding the foamed resin comprises blowing air into the extruded resin to obtain a largest blow ratio of 0.2 or more and 0.5 or less.

2. The method according to claim 1, wherein blending the polypropylene-based resin comprises adding talc to the polypropylene-based resin, wherein a concentration of the talc is 0.8 parts by weight of the polypropylene-based resin.

3. The method according to claim 1, wherein molding the molded foam includes formation at an expansion ratio of 2 to 5 times.

4. A molded foam obtained by blending a polypropylene-based resin having an equilibrium compliance from 2.0 to 6.0 ($10^{-3} \times Pa^{-1}$), which is a blend having 70 wt % or more of a regrind of the molded foam, with a foaming agent and kneading the blend in an extruder, and molding the foamed resin extruded through the extruder so as to be fit along a mold by a pressurized fluid,
   the molded foam having a largest blow ratio of 0.2 or more and 0.5 or less, an expansion ratio from 1.8 to 3.2 times, and an impact strength of not less than 30 kg·cm.

5. The molded foam according to claim 4, which is a climate control duct for a vehicle.

6. The molded foam according to claim 4, wherein the polypropylene-based resin comprises 0.8 parts by weight of talc.

7. A method for molding a molded foam, comprising the steps of:
   blending a polypropylene-based resin having an equilibrium compliance from 2.0 to 6.0 ($10^{-3} \times Pa^{-1}$), which is a blend mixed with 70 wt % or more of a regrind of the molded foam, with a foaming agent and kneading the blend in an extruder; and
   molding the foamed resin extruded through the extruder so as to be fit along a mold by a pressurized fluid, wherein molding the foamed resin comprises blowing air into the extruded resin to obtain a largest blow ratio of ranging from 0.2-0.5, and wherein molding the molded foam includes formation at an expansion ratio of 1.8 to 2 times.

8. A molded foam obtained by blending a polypropylene-based resin having an equilibrium compliance from 2.0 to 6.0 ($10^{-3} \times Pa^{-1}$), which is a blend having 70 wt % or more of a regrind of the molded foam, with a foaming agent and kneading the blend in an extruder, and molding the foamed resin extruded through the extruder so as to be fit along a mold by a pressurized fluid,
   the molded foam having a largest blow ratio of 0.2 or more and 0.5 or less, an expansion ratio from 1.8 to 2.0 times, and an impact strength of not less than 30 kg·cm.

* * * * *